United States Patent
Xie et al.

(10) Patent No.: US 11,805,458 B2
(45) Date of Patent: Oct. 31, 2023

(54) MEASUREMENT REPORT CONFIGURATION METHOD, MEASUREMENT REPORT METHOD, CELL HANDOVER METHOD AND DEVICE

(71) Applicants: China Mobile Communication Co., Ltd Research Institute, Beijing (CN); China Mobile Communications Group Co., Ltd., Beijing (CN)

(72) Inventors: Fang Xie, Beijing (CN); Guangyi Liu, Beijing (CN)

(73) Assignees: China Mobile Communication Co., Ltd Research Institute, Beijing (CN); China Mobile Communications Group Co., Ltd., Beijing (CN)

(*) Notice: Subject to any disclaimer, the term of this patent is extended or adjusted under 35 U.S.C. 154(b) by 194 days.

(21) Appl. No.: 17/052,840

(22) PCT Filed: Apr. 30, 2019

(86) PCT No.: PCT/CN2019/085110
§ 371 (c)(1),
(2) Date: Nov. 4, 2020

(87) PCT Pub. No.: WO2019/210839
PCT Pub. Date: Nov. 7, 2019

(65) Prior Publication Data
US 2021/0243660 A1    Aug. 5, 2021

(30) Foreign Application Priority Data
May 4, 2018 (CN) .......................... 201810419057.3

(51) Int. Cl.
H04W 4/00       (2018.01)
H04W 36/00      (2009.01)
(Continued)

(52) U.S. Cl.
CPC ....... *H04W 36/0085* (2018.08); *H04W 24/10* (2013.01); *H04W 36/0072* (2013.01);
(Continued)

(58) Field of Classification Search
CPC ............. H04W 36/0085; H04W 24/10; H04W 36/0072; H04W 36/30; H04W 36/32;
(Continued)

(56) References Cited

U.S. PATENT DOCUMENTS 9,265,076 B2    2/2016  Schmidt et al.
9,949,298 B1 *  4/2018  Akoum ............... H04B 7/0695
(Continued)

FOREIGN PATENT DOCUMENTS

CA    3024585 C  *  5/2019  .......... H04L 1/0026
CN    107733473 A    2/2018
(Continued)

OTHER PUBLICATIONS

Samsung, "DL beam management RS for multi-beam > 6GHZ NR system", 3GPP TSG RAN WG1 #87, R1-1612495 Reno, USA Nov. 14-18, 2016.
(Continued)

*Primary Examiner* — Amancio Gonzalez
(74) *Attorney, Agent, or Firm* — Price Heneveld LLP (57) ABSTRACT

A measurement report configuration method, a measurement report method, a cell handover method and a device are provided. The measurement report method includes: measuring a beam and reporting relevant information of the beam by user equipment in a connected state.

12 Claims, 5 Drawing Sheets

(51) Int. Cl.
*H04W 24/10* (2009.01)
*H04W 36/30* (2009.01)
*H04W 36/32* (2009.01)
*H04W 74/08* (2009.01)

(52) U.S. Cl.
CPC .......... *H04W 36/30* (2013.01); *H04W 36/32* (2013.01); *H04W 74/0833* (2013.01)

(58) Field of Classification Search
CPC ......... H04W 74/0833; H04W 36/0094; H04W 72/046; H04W 72/085; H04W 36/08; H04W 36/0083; H04W 74/0866
USPC .......................................................... 370/332
See application file for complete search history.

(56) References Cited

U.S. PATENT DOCUMENTS

| | | | |
|---|---|---|---|
| 9,960,830 B2* | 5/2018 | Yoo | H01Q 3/30 |
| 10,091,759 B2* | 10/2018 | Lin | H04B 7/088 |
| 10,185,052 B2* | 1/2019 | Inanc | G01V 5/125 |
| 10,498,504 B2* | 12/2019 | Sang | H04B 17/318 |
| 11,025,333 B2* | 6/2021 | Kim | H04W 56/0005 |
| 11,039,454 B2* | 6/2021 | Harada | H04L 5/0048 |
| 11,044,739 B2* | 6/2021 | Li | H04L 1/1896 |
| 11,088,750 B2* | 8/2021 | Zhou | H04B 7/0695 |
| 11,122,454 B2* | 9/2021 | Kim | H04W 24/10 |
| 11,206,549 B1* | 12/2021 | Eyuboglu | H04J 11/0079 |
| 11,228,974 B2* | 1/2022 | Park | H04W 8/24 |
| 2016/0262077 A1 | 9/2016 | Zhang et al. | |
| 2018/0172876 A1* | 6/2018 | Inanc | G01V 5/045 |
| 2018/0219606 A1* | 8/2018 | Ng | H04W 72/0453 |
| 2018/0279181 A1* | 9/2018 | Hampel | H04W 72/046 |
| 2019/0104507 A1* | 4/2019 | Majmundar | H04W 36/0069 |
| 2019/0104549 A1* | 4/2019 | Deng | H04L 27/2607 |
| 2019/0223044 A1* | 7/2019 | Qin | H04W 76/15 |
| 2019/0230547 A1* | 7/2019 | Li | H04L 47/2483 |
| 2019/0335376 A1* | 10/2019 | Huang | H04W 36/0058 |
| 2020/0028560 A1* | 1/2020 | Gao | H04W 72/046 |
| 2020/0045725 A1* | 2/2020 | Mochizuki | H04W 72/046 |

FOREIGN PATENT DOCUMENTS

| | | |
|---|---|---|
| CN | 107820717 A | 3/2018 |
| CN | 107888259 A | 4/2018 |
| CN | 107889141 A | 4/2018 |
| CN | 107889220 A | 4/2018 |
| WO | 2014161268 A1 | 10/2014 |

OTHER PUBLICATIONS

AT&T, "Beam Management Framework for Initial Access UE", 3GPP TSG RAN WG1 Meeting #88bis, R1-1704341, Spokane, WA, Apr. 3-7, 2017.

CMCC, "New Measurements for NR MDT", 3GPP TSG-RAN WG2 Meeting #105, R2-1901957, Athens, Greece, Feb. 25-Mar. 1, 2019.

Qualcomm Inc., "Discussion of beam level measurements reporting in logged MDT in NR", 3GPP TSG RAN WG2 Meeting #105bis, R2-1903072, Xi'an, China, Apr. 8-12, 2019.

Samsung, "Beam Selection for HO Access", 3GPP TSG-RAN WG2 #99bis, R2-1710082, Prague, Czech Republic, Oct. 9-13, 2017.

Huawei, "Allocation of appropriate RACH resources for handover", 3GPP TSG-RAN WG2 #99, R2-1708883, Berlin, Germany, Aug. 21-25, 2017.

* cited by examiner

Fig. 1

Transmitting measurement report configuration information to user equipment, wherein the configuration information includes: the user equipment is required to report an identifier of a measured beam

Fig. 2

Measuring and reporting information of a beam by user equipment in a connected state, wherein the reported beam information includes an identifier of the beam — 21

Fig. 3

Measuring information of a beam and logging measured beam information by user equipment in an idle state or an inactive state — 31

Reporting measured beam information after the user equipment enters a connected state, wherein the reported beam information includes a beam identifier — 32

Fig. 4

Receiving beam information reported by user equipment, wherein the reported beam information includes: a beam identifier — 41

Transmitting a handover request to a target base station when it is determined that the user equipment needs to be handed over to a target cell, wherein the handover request carries at least a part of the beam information reported by the user equipment, or carries movement direction and/or movement speed information of the user equipment obtained according to the beam information reported by the user equipment — 42

Fig. 5

Receiving a handover request transmitted by a source gNB where user equipment is located, wherein the handover request carries at least a part of beam information reported by the user equipment, or carries movement direction and/or movement speed information of the user equipment obtained by the source gNB according to beam information reported by the user equipment — 51

According to the handover request, allocating a downlink beam for a random access procedure to the user equipment and possibly allocating a dedicated random access resource associated with the beam to the user equipment — 52

# MEASUREMENT REPORT CONFIGURATION METHOD, MEASUREMENT REPORT METHOD, CELL HANDOVER METHOD AND DEVICE

CROSS-REFERENCE TO RELATED APPLICATIONS

This application is a U.S. national phase application of a PCT Application No. PCT/CN2019/085110 filed on Apr. 30, 2019, which claims priority to Chinese Patent Application No. 201810419057.3 filed in China on May 4, 2018, disclosure of which are incorporated herein by reference in their entirety.

TECHNICAL FIELD

This disclosure relates to the technical field of wireless communication, in particular to a measurement report configuration method, a measurement report method, a cell handover method and a device.

BACKGROUND

In wireless communication, an electromagnetic wave can be manipulated to propagate in a specific direction, so that users in different spatial directions can simultaneously and uninterruptedly communicate by using all spectrum resources, namely space division multiple access (SDMA). The technique of propagating radio signals (electromagnetic waves) only in a specific direction is called beamforming. 5G communication technology uses beamforming to improve spectrum utilization efficiency, so that the communication system has high bandwidth and the communication speed is greatly improved.

Figure 1:
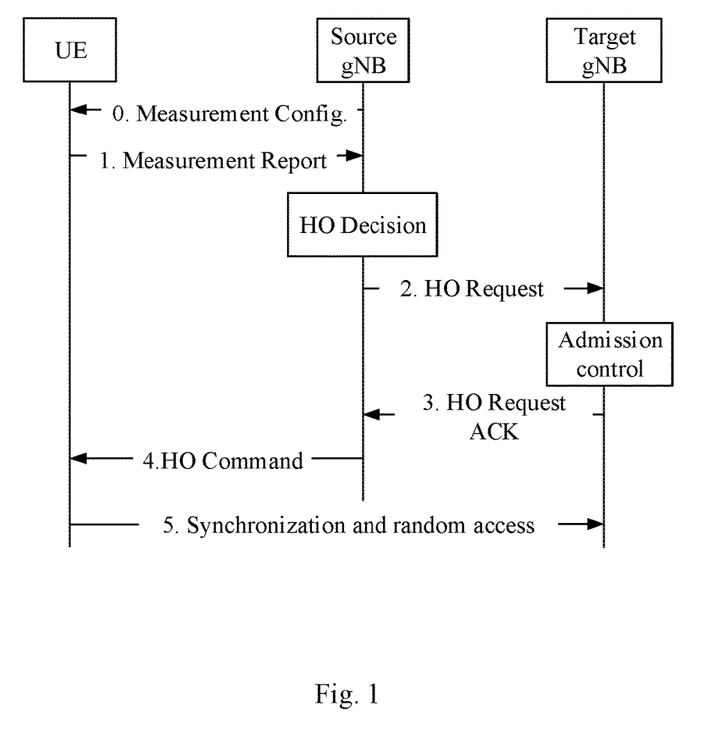
FIG. 1 is a schematic flow diagram of target cell handover.

Referring to FIG. 1, a general process of cell handover in the related art is as follows: before handover, a source gNB or other network element on a network side firstly carries out measurement configuration (Measurement Config.) on user equipment (UE); after the configuration is completed, a first step is that the user equipment performs measurement and reports (Measurement Report), a second step is that the source gNB makes a handover decision (HO Decision) according to the information reported by the Measurement Report step and sends a handover request (HO Request) to a target gNB, a third step is that the target gNB performs admission control according to the information carried in the handover request and sends a handover request acknowledgement (HO Request ACK), a fourth step is that the source gNB sends a handover command (HO Command) to the user equipment after receiving the handover request acknowledgement and forwards the information carried in the handover request acknowledgement to the user equipment, and a fifth step is that the user equipment completes a synchronization and random access procedure according to the information carried in the handover request acknowledgement. Since the beam is introduced by the 5G communication technology, there is no need to measure the beam related information in the related wireless communication technology, including the target cell handover technology. However, in 5G communication, for example, in a target cell handover procedure, if beam measurement is not performed, an appropriate beam cannot be allocated to user equipment, thereby it is difficult to ensure communication quality and continuity of communication.

SUMMARY

Accordingly, the present disclosure provides a measurement report configuration method, a measurement report method, a cell handover method and a device, to solve the technical problem in the related wireless communication technology that only a cell is measured and no beam is measured.

To solve the above-mentioned technical problem, in a first aspect, the present disclosure provides a measurement report configuration method. The method is applied to network device and including: transmitting measurement report configuration information to user equipment, wherein the measurement report configuration information includes: the user equipment is required to report relevant information of a measured beam.

Optionally, the relevant information of the beam includes at least one of:
an identifier of the beam;
quality information of the beam;
a quality threshold to be met by the beam;
a time when the beam is measured or the beam measurement is logged;
a minimum quantity of reported beams.

Optionally, the identifier of the beam is an index of a synchronization signal and PBCH block (SS-block) broadcast by the network device and/or an index of a channel state information reference signal (CSI-RS) configured by the network device for the user equipment.

Optionally, the configuration information includes the quality threshold of the beam reported by the user equipment, and the quality threshold includes at least one of an RSRP quality threshold, an RSRQ quality threshold and an SINR quality threshold, wherein the RSRP quality threshold, the RSRQ quality threshold and the SINR quality threshold are identical or different.

Optionally, the configuration information includes the minimum quantity of reported beams, and the minimum quantity of reported beams includes at least one of: a minimum quantity configured with regard to SS-block RSRP, a minimum quantity configured with regard to SS-block RSRQ, a minimum quantity configured with regard to SS-block SINR, a minimum quantity configured with regard to CSI-RS RSRP, a minimum quantity configured with regard to CSI-RS RSRQ, and a minimum quantity configured with regard to CSI-RS SINR, wherein, the minimum quantity configured with regard to SS-block RSRP and the minimum quantity configured with regard to CSI-RS RSRP are identical or different, the minimum quantity configured with regard to SS-block RSRQ and the minimum quantity configured with regard to CSI-RS RSRQ are identical or different, and the minimum quantity configured with regard to SS-block SINR and the minimum quantity configured with regard to CSI-RS SINR are identical or different.

In a second aspect, the present disclosure further provides a measurement report method. The method is applied to user equipment and includes: measuring a beam and reporting relevant information of the beam by user equipment in a connected state.

Optionally, the reported relevant information of the beam includes at least one of:
an identifier of the beam;
quality information of the beam;
a time when the beam is measured or the beam measurement is logged.

Optionally, before the measuring and reporting the relevant information of the beam by the user equipment in the connected state, the measurement report method further includes: receiving measurement report configuration information transmitted by a network device, wherein the measurement report configuration information includes: the user equipment is required to report relevant information of a measured beam.

Optionally, the relevant information of the beam includes at least one of:
 an identifier of the beam;
 quality information of the beam;
 a quality threshold to be met by the beam;
 a time when the beam is measured or the beam measurement is logged;
 a minimum quantity of reported beams.

Optionally, the identifier of the beam is an index of a synchronization signal and PBCH block (SS-block) broadcast by the network device, and/or an index of a channel state information reference signal (CSI-RS) configured by the network device for the user equipment.

Optionally, the reported beam includes all beams measured by the user equipment, or a beam having a quality greater than or equal to a quality threshold.

Optionally, in the reported relevant information of the beam, the reported beam is ordered in forward sequence or reverse sequence of time when the beam is measured.

Optionally, the reported relevant information of the beam includes: a beam measured based on SS-block and/or a beam measured based on CSI-RS, wherein the beam measured based on SS-block and/or the beam measured based on CSI-RS is separately or jointly ordered according to the time when the beam is measured.

In a third aspect, the present disclosure further provides a measurement report method. The method is applied to user equipment and includes:
 measuring a beam and logging relevant information of the measured beam by user equipment in an idle state or an inactive state;
 reporting the relevant information of the measured beam after the user equipment enters a connected state.

Optionally, the relevant information of the beam includes at least one of:
 an identifier of the beam;
 quality information of the beam;
 a time when the beam is measured or the beam measurement is logged.

Optionally, the reporting the relevant information of the measured beam after the user equipment enters the connected state includes:
 receiving inquiry information transmitted by a network device by user equipment in a connected state, wherein the inquiry information is used for inquiring whether the user equipment logs the relevant information of the measured beam; and
 reporting the relevant information of the measured beam by the user equipment.

Optionally, the inquiry information includes at least one of:
 an identifier of the beam;
 quality information of the beam;
 a quality threshold to be met by the beam;
 a time when the beam is measured or the beam measurement is logged;
 a minimum quantity of reported beams;
 a format requirement on the identifier of the beam reported by the user equipment;
 a format requirement on the quality information of the beam reported by the user equipment;
 a format requirement on the time when the beam is measured or the beam measurement is logged reported by the user equipment.

Optionally, the reporting the relevant information of the measured beam after the user equipment enters the connected state includes:
 transmitting a notification message to the network device by the user equipment, wherein the notification message is used for notifying the network device that the user equipment logs the relevant information of the measured beam;
 receiving indication information transmitted by the network device based on the notification message, wherein the indication information is used for indicating that the user equipment is to report relevant information of a beam measured by the user equipment, and the indication information includes at least one of: an identifier of the beam; quality information of the beam; a quality threshold to be met by the beam; a time when the beam is measured or the beam measurement is logged; a minimum quantity of reported beams; a format requirement on the identifier of the beam reported by the user equipment; a format requirement on the quality information of the beam reported by the user equipment; a format requirement on the time when the beam is measured or the beam measurement is logged reported by the user equipment; and
 reporting the relevant information of the measured beam by the user equipment according to the indication information.

Optionally, after the measuring the beam and logging the relevant information of the measured beam by the user equipment in the idle state or the inactive state, the measurement report method further includes: determining, by the user equipment in the idle state or the inactive state, a speed of the user equipment according to the relevant information of the measured beam.

In a fourth aspect, the present disclosure further provides a cell handover method. The method is applied to a network device and includes:
 receiving relevant information of a beam reported by user equipment; and
 transmitting a handover request to a target base station when it is determined that the user equipment needs to be handed over to a target cell, wherein the handover request carries at least a part of the relevant information of the beam reported by the user equipment or carries movement direction and/or movement speed information of the user equipment obtained according to the relevant information of the beam reported by the user equipment.

In a fifth aspect, the present disclosure further provides a cell handover method. The method is applied to a network device and includes:
 receiving a handover request transmitted by a source gNB where user equipment is located, wherein the handover request carries at least a part of relevant information of a beam reported by the user equipment, or carries movement direction and/or movement speed information of the user equipment obtained by the source gNB according to the relevant information of the beam reported by the user equipment;
 allocating a downlink beam for a random access procedure and/or a dedicated random access resource associated with the beam to the user equipment according to the handover request.

Optionally, the downlink beam for the random access procedure is a beam reported by the user equipment, or a beam determined according to the movement direction and/or movement speed information of the user equipment.

In a sixth aspect, the present disclosure further provides a network device. The network device includes: a transceiver, configured to transmit measurement report configuration information to user equipment, wherein the measurement report configuration information includes: the user equipment is required to report relevant information of a measured beam.

Optionally, the relevant information of the beam includes at least one of:
an identifier of the beam;
quality information of the beam;
a quality threshold to be met by the beam;
a time when the beam is measured or the beam measurement is logged;
a minimum quantity of reported beams.

Optionally, the identifier of the beam is an index of a synchronization signal and PBCH block (SS-block) broadcast by the network device and/or an index of a channel state information reference signal (CSI-RS) configured by the network device for the user equipment.

Optionally, the configuration information includes a quality threshold of a beam reported by the user equipment, and the quality threshold includes at least one of an RSRP quality threshold, an RSRQ quality threshold and an SINR quality threshold, wherein the RSRP quality threshold, the RSRQ quality threshold and the SINR quality threshold are identical or different.

Optionally, the configuration information includes the minimum quantity of reported beams, and the minimum quantity of reported beams includes at least one of: a minimum quantity configured with regard to SS-block RSRP, a minimum quantity configured with regard to SS-block RSRQ, a minimum quantity configured with regard to SS-block SINR, a minimum quantity configured with regard to CSI-RS RSRP, a minimum quantity configured with regard to CSI-RS RSRQ, and a minimum quantity configured with regard to CSI-RS SINR, wherein, The minimum quantity configured with regard to SS-block RSRP and the minimum quantity configured with regard to CSI-RS RSRP are identical or different, the minimum quantity configured with regard to SS-block RSRQ and the minimum quantity configured with regard to CSI-RS RSRQ are identical or different, and the minimum quantity configured with regard to SS-block SINR and the minimum quantity configured with regard to CSI-RS SINR are identical or different.

In a seventh aspect, the present disclosure further provides user equipment. The user equipment includes:
a processor, configured to measure a beam and obtain relevant information of the beam when the user equipment is in a connected state;
a transceiver, configured to report the relevant information of the beam.

Optionally, the reported relevant information of the beam includes at least one of:
an identifier of the beam;
quality information of the beam;
a time when the beam is measured or the beam measurement is logged.

Optionally, the transceiver is configured to receive measurement report configuration information transmitted by a network device, wherein the measurement report configuration information includes: the user equipment is required to report relevant information of a measured beam.

Optionally, the relevant information of the beam includes at least one of:
an identifier of the beam;
quality information of the beam;
a quality threshold to be met by the beam;
a time when the beam is measured or the beam measurement is logged;
a minimum quantity of reported beams.

Optionally, the identifier of the beam is an index of a synchronization signal and PBCH block (SS-block) broadcast by a network device, and/or an index of a channel state information reference signal (CSI-RS) configured by the network device for the user equipment.

Optionally, the reported beam includes all beams measured by the user equipment, or a beam having a quality greater than or equal to a quality threshold.

Optionally, in the reported relevant information of the beam, the reported beam is ordered in forward sequence or reverse sequence of time when the beam is measured.

Optionally, the reported relevant information of the beam includes: a beam measured based on SS-block and/or a beam measured based on CSI-RS, wherein the beam measured based on SS-block and/or the beam measured based on CSI-RS is separately or jointly ordered according to the time when the beam is measured.

In an eighth aspect, the present disclosure further provides user equipment. The user equipment includes:
a processor, configured to measure a beam and log the measured relevant information when the user equipment is in an idle state or an inactive state;
a transceiver, configured to report the relevant information of the measured beam after the user equipment enters a connected state.

Optionally, the relevant information of the beam includes at least one of:
an identifier of the beam;
quality information of the beam;
a time when the beam is measured or the beam measurement is logged.

Optionally, the transceiver is configured to receive inquiry information transmitted by a network device after the user equipment enters a connected state, wherein the inquiry information is used for inquiring whether the user equipment logs relevant information of a measured beam; and the user equipment reports the relevant information of the measured beam.

Optionally, the inquiry information includes at least one of:
an identifier of the beam;
quality information of the beam;
a quality threshold to be met by the beam;
a time when the beam is measured or the beam measurement is logged;
a minimum quantity of reported beams;
a format requirement on the identifier of the beam reported by the user equipment;
a format requirement on the quality information of the beam reported by the user equipment;
a format requirement on the time when the beam is measured or the beam measurement is logged reported by the user equipment.

Optionally, the transceiver is configured to: transmit a notification message to a network device after the user equipment enters a connected state, wherein the notification message is used for notifying the network device that the user equipment logs the relevant information of the measured beam; receive indication information transmitted by the network device based on the notification message, wherein the indication information is used for indicating that the user equipment is to report the relevant information of the beam measured by the user equipment, and the indication information includes at least one of: an identifier of the beam; quality information of the beam; a quality threshold to be met by the beam; a time when the beam is measured or the beam measurement is logged; a minimum quantity of reported beams; a format requirement on the identifier of the beam reported by the user equipment; a format requirement on the beam quality information reported by the user equipment; a format requirement on the time when the beam is measured or the beam measurement is logged reported by the user equipment; and the user equipment reports the relevant information of the measured beam according to the indication information.

Optionally, the processor is configured to determine a speed of the user equipment according to the relevant information of the measured beam when the user equipment is in an idle state or an inactive state.

In a ninth aspect, the present disclosure further provides a network device. The network device includes:

a transceiver, configured to receive relevant information of a beam reported by user equipment; and transmit a handover request to a target base station when it is determined that the user equipment needs to be handed over to a target cell, wherein the handover request carries at least a part of the relevant information of the beam reported by the user equipment, or carries movement direction and/or movement speed information of the user equipment obtained according to the relevant information of the beam reported by the user equipment.

In a tenth aspect, the present disclosure further provides a network device. The network device includes:

a transceiver, configured to receive a handover request transmitted by a source gNB where user equipment is located, wherein the handover request carries at least a part of relevant information of a beam reported by the user equipment, or carries movement direction and/or movement speed information of the user equipment obtained by the source gNB according to the relevant information of the beam reported by the user equipment;

a processor, configured to allocate a downlink beam for a random access procedure and/or a dedicated random access resource associated with the beam to the user equipment according to the handover request.

Optionally, the downlink beam for the random access procedure is a beam reported by the user equipment, or a beam determined according to the movement direction and/or movement speed information of the user equipment.

In an eleventh aspect, the present disclosure further provides a network device including a memory, a processor, and a computer program stored in the memory and configured to be executed by the processor; wherein the processor is configured to execute the computer program to implement the foregoing measurement report configuration method.

In a twelfth aspect, the present disclosure further provides user equipment including a memory, a processor, and a computer program stored in the memory and configured to be executed by the processor; wherein the processor is configured to execute the computer program to implement the foregoing measurement report method.

In a thirteenth aspect, the present disclosure further provides a network device including a memory, a processor, and a computer program stored in the memory and configured to be executed by the processor; wherein the processor is configured to execute the computer program to implement the foregoing cell handover method.

In a fourteenth aspect, the present disclosure further provides a computer-readable storage medium storing therein a computer program, wherein the computer program is configured to be executed by a processor to perform the steps in the measurement report configuration method described above, or perform the steps in the measurement report method described above, or perform the steps in the cell handover method described above.

The beneficial effects of the foregoing technical solutions of the present disclosure are as follows.

In view of the problem that the related wireless communication technology does not need to measure beam and does not measure beam, the user equipment of the present disclosure measures and reports related information of a beam while measuring and reporting identifier and quality information of a cell. The measured beam can be used as a candidate beam during cell handover, and can also be used for determining the moving speed and direction of the user equipment, so that an appropriate target beam can be conveniently selected. In addition, if the user equipment reports information related to the measured beam, the target gNB can reserve for the user equipment dedicated random access resources used for initiating random access in the target cell, and/or association information between the SS-block or CSI-RS and the random access resources, and transmit the dedicated random access resources and/or the association information to the UE in a handover command.

BRIEF DESCRIPTION OF THE DRAWINGS

In order to more clearly illustrate the technical solutions of the embodiments of the present disclosure, the drawings used in the description of the embodiments of the present disclosure will be briefly described below, and it is obvious that the drawings in the following description are only some embodiments of the present disclosure, and that other drawings can be obtained from the drawings by a person skilled in the art without any creative effort.

DETAILED DESCRIPTION

To describe the objectives, the technical solutions and the advantages of embodiments of the present disclosure more clearly, technical solutions of embodiments of the present disclosure are described in detail hereinafter with reference to the accompanying drawings. It is to be understood that the described embodiments are some, but not all, embodiments of the present disclosure. Based on the described embodiments of the present disclosure, all other embodiments obtained by one of ordinary skill in the art are within the scope of the present disclosure.

Figure 2:
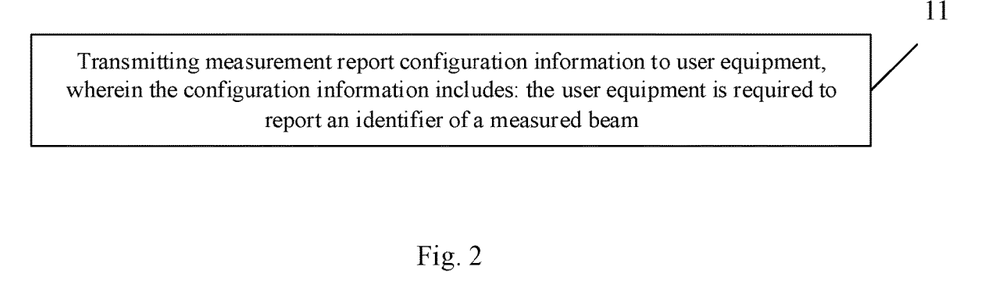
FIG. 2 is a schematic flow diagram of a measurement report configuration method according to a first embodiment of the present disclosure.

Referring to FIG. 2, a first embodiment of the present disclosure provides a measurement report configuration method applied to a network device, wherein the network device can be a base station or other network element on a network side. The method includes: step 11, transmitting measurement report configuration information to user equipment, wherein the configuration information includes: the user equipment is required to report relevant information of a measured beam.

The 5G handover procedure uses Long Term Evolution (LTE) as a baseline, and includes procedures such as measurement configuration, measurement report, handover request, handover acknowledgement, and UE initiating random access in the target cell. Multi-beam is introduced into the beamforming technology employed in 5G, i.e., each user equipment needs to use a particular beam in the cell to carry out communication. As a result, measurement of nearby beams is required at cell handover. Therefore, the embodiment of the present disclosure provides a measurement report configuration method, so that user equipment may be configured to measure beams and report measured beam-related information. The measured beam can be used as a candidate beam during cell handover, and can also be used for determining the moving speed and direction of the user equipment, so that an appropriate target beam can be conveniently selected. In addition, since the main purpose of measurement report is to help a target cell select a target beam and reserve a preamble code (random access preamble code) and corresponding physical random access channel (PRACH) resource, measurement and report of a cell identifier and cell quality information must also be configured.

Specifically, the beam measured by the user equipment includes a beam of a camped cell and/or a serving cell and/or a neighboring cell.

As an optional implementation, the relevant information of the beam includes at least one of:
an identifier of the beam;
quality information of the beam;
a quality threshold to be met by the beam;
a time when the beam is measured or the beam measurement is logged;
a minimum quantity of reported beams.

The measured beam quality information may be used as a reference during target beam selection. In addition, a quantity of measured beams and corresponding quality information can be used for determining the moving direction and speed of the user equipment, thus a minimum quantity of reported beams needs to be configured. The measured beams with poor qualities have little significance in the selection of target beam and the determination of moving speed and direction of the user equipment, thus a quality threshold to be met by reported beams may also be configured in order to save resources.

For 5G NR cells operating at different carrier frequencies, quantities of configurable beams can be different. The higher the frequency, the greater the quantity of configurable beams, and the narrower the width of each beam; thus the faster the beam detected by the user equipment may vary. On the other hand, the higher the frequency band, the faster the radio channel changes. A beam of reasonable quality detected and reported by UE in a radio resource management (RRM) measurement is likely to become unusable when the UE communicates in the target cell. Therefore, in order to improve the accuracy in reserving random access resources and downlink beams for the UE by the target cell, the network device can configure the UE to report the beam information measured by the UE within a period of time and the time when the beam is measured, and the network device can determine the moving direction and speed of the UE according to the reported information, and reserve the downlink beam and the random access resource used in the target cell more accurately.

As one specific implementation, an identifier of the beam is an index of a synchronization signal and PBCH block (SS-block) broadcast by the network device, and/or an index of a channel state information reference signal (CSI-RS) configured by the network device for the user equipment. When the quality information of the beam is measured, the measurement can be carried out on the SS-block or the CSI-RS. In the embodiment, in order to distinguish whether the quality information of the beam is based on the SS-block or the CSI-RS, the index of the SS-block or the index of the CSI-RS can be directly utilized in setting the beam identifier. In other implementations, the beam identifier may be other parameters related to the beam, so long as it can be distinguished whether the quality information of the beams is measured based on SS-block or CSI-RS.

In the embodiment, the configuration information may include the quality threshold of the beam reported by the user equipment, and the quality threshold includes at least one of a reference signal receiving power (RSRP) quality threshold, a reference signal receiving quality (RSRQ) quality threshold and a signal to interference plus noise ratio (SINR) (i.e., signal-to-noise ratio) quality threshold, wherein the RSRP quality threshold, the RSRQ quality threshold and the SINR quality threshold are identical or different. The measurement parameter of the beam quality information can be specifically selected according to actual needs. A difference from the provision regarding the beam reported by UE in the related art is that: the related art specifies that the quality of the beam reported by the UE must exceed an absolute value threshold, while in the embodiment of the present disclosure, UE may be configured to report beam information with no regard for the threshold, or may be configured to report beam information subject to the limit of a new threshold. The new threshold may be lower than the absolute value threshold specified in the related art, and different threshold values may also be set for different quality parameters, e.g., RSRP, RSRQ, and SINR.

In this embodiment, the configuration information may include the minimum quantity of reported beams, and the minimum quantity of reported beams includes at least one of: a minimum quantity configured with regard to SS-block RSRP, a minimum quantity configured with regard to SS-block RSRQ, a minimum quantity configured with regard to SS-block SINR, a minimum quantity configured with regard to CSI-RS RSRP, a minimum quantity configured with regard to CSI-RS RSRQ, and a minimum quantity configured with regard to CSI-RS SINR; wherein, the minimum quantity configured with regard to SS-block RSRP and the minimum quantity configured with regard to CSI-RS RSRP are identical or different, the minimum quantity configured with regard to SS-block RSRQ and the minimum quantity configured with regard to CSI-RS RSRQ are identical or different, and the minimum quantity configured with regard to SS-block SINR and the minimum quantity configured with regard to CSI-RS SINR are identical or different. That is, the minimum quantity of reported beams may be set with different values corresponding to RSRP, RSRQ, and SINR respectively, and the minimum quantity of reported beams may also be set with different values corresponding to SS-block and CSI-RS respectively; or the minimum quantity of reported beams may be set with the same value.

The main purpose of configuring the minimum quantity of reported beams is to ensure that the quantity of beams reported by the UE is large enough to be used for estimating the moving direction and speed of the UE.

Figure 3:
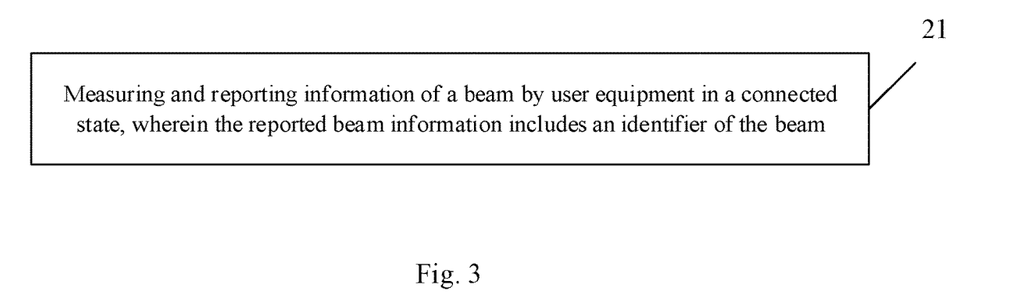
FIG. 3 is a schematic flow diagram of a measurement report method according to a second embodiment of the present disclosure.

Referring to FIG. 3, a second embodiment of the present disclosure provides a measurement report method applied to user equipment. The method includes: step 21, measuring a beam and reporting relevant information of the beam by user equipment in a connected state.

Multi-beam is introduced into the beamforming technology employed in 5G, i.e., each user equipment needs to use a particular beam in the cell to carry out communication. As a result, in addition to the measurement of a neighboring cell, measurement of nearby beams is required at cell handover. Therefore, the embodiment of the disclosure provides a measurement report method in which user equipment measures and reports related information of a beam while measuring and reporting identifier and quality information of a cell. The measured beam can be used as a candidate beam during cell handover, and can also be used for determining the moving speed and direction of the user equipment, so that an appropriate target beam can be conveniently selected. In addition, if the user equipment reports the measured beam-related information, the target gNB can reserve for the user equipment dedicated random access resources used for initiating random access in the target cell and/or association information between the SS-block or CSI-RS and the random access resources, and transmit the same to the user equipment (UE) in a handover command.

Specifically, the relevant information of the beam measured and reported by the user equipment includes relevant information of a beam of a serving cell and/or a neighboring cell.

As an optional specific implementation, the reported relevant information of the beam includes at least one of: an identifier of the beam; quality information of the beam; a time when the beam is measured or the beam measurement is logged.

In the embodiment, the quality information of the beam can be used as a reference when selecting a target beam. In addition, according to a certain quantity of beams and corresponding quality information thereof, the movement direction and speed of the user equipment (UE) can be determined, so as to allocate an appropriate beam according to the movement direction and speed of the user equipment (UE).

Since a beam of reasonable quality detected by UE in a measurement is likely to become unusable when the UE communicates in the target cell, in order to improve the accuracy in reserving random access resources and downlink beams for the UE by the target cell, the user equipment (UE) in the embodiment can report the information of the beam measured in a period of time and the time when the beam is measured, so that the network device can determine the moving direction and speed of the UE according to the reported information and more accurately reserve a downlink beam and random access resources used in the target cell.

Optionally, before the measuring and reporting the relevant information of the beam by the user equipment in the connected state, the method further includes: receiving measurement report configuration information transmitted by a network device, wherein the configuration information includes: the user equipment is required to report relevant information of a measured beam.

Specifically, the relevant information of the beam includes at least one of:
an identifier of the beam;
quality information of the beam;
a quality threshold to be met by the beam;
a time when the beam is measured or the beam measurement is logged;
a minimum quantity of reported beams.

The measured beam quality information may be used as a reference during target beam selection. In addition, a quantity of measured beams and corresponding quality information can be used for determining the moving direction and speed of the user equipment, thus a minimum quantity of reported beams needs to be configured. The measured beams with poor qualities have little significance in the selection of target beam and the determination of moving speed and direction of the user equipment, thus a quality threshold to be met by reported beams may also be configured in order to save resources.

For 5G NR cells operating at different carrier frequencies, quantities of configurable beams can be different. The higher the frequency, the greater the quantity of configurable beams, and the narrower the width of each beam; thus the faster the beam detected by the user equipment may vary. On the other hand, the higher the frequency band, the faster the radio channel changes. A beam of reasonable quality detected and reported by UE in a radio resource management (RRM) measurement is likely to become unusable when the UE communicates in the target cell. Therefore, in order to improve the accuracy in reserving random access resources and downlink beams for the UE by the target cell, the network device can configure the UE to report the beam information measured by the UE within a period of time and the time when the beam is measured, and the network device can determine the moving direction and speed of the UE according to the reported information, and reserve the downlink beam and the random access resource used in the target cell more accurately.

The above-mentioned step of receiving the measurement report configuration information transmitted by the network device is optional, that is to say, the configuration information transmitted by the network device may not be received. Instead, the report is performed directly according to the reporting content specified in advance.

Specifically, an identifier of the beam is an index of an SS-block broadcast by the network device, and/or an index of a CSI-RS configured by the network device for the user equipment. When the quality information of the beam is measured, the measurement can be carried out on the SS-block or the CSI-RS. In the embodiment, in order to distinguish whether the quality information of the beam is based on the SS-block or the CSI-RS, the index of the SS-block or the index of the CSI-RS can be directly utilized in setting the beam identifier. In other implementations, the beam identifier may be other parameters related to the beam, so long as it can be distinguished whether the quality information of the beams is measured based on SS-block or CSI-RS.

The reported beam includes all beams measured by the user equipment or a beam with a quality greater than or equal to a quality threshold. In the embodiment, according to actual needs, all measured beams can be reported, or only a beam with a quality greater than or equal to a certain quality threshold is reported so as to reduce resource waste.

Optionally, in the reported relevant information of the beam, the reported beam is ordered in sequence of time when the beam is measured, and specifically can be ordered in forward sequence of time or in reverse sequence of time. When the reported beam information does not include the time when the beam is measured, the reported beam is ordered according to the time when the beam is measured, so that a beam measured later in the sequence is preferentially selected as the target beam. In addition, since the cell information needs to be measured and reported as well, in a specific implementation, the measured cell information and beam information can be ordered according to time together during reporting.

Optionally, the reported relevant information of the beam includes: the beam measured based on SS-block and the beam measured based on CSI-RS, wherein the beam measured based on SS-block and the beam measured based on CSI-RS are separately or jointly ordered according to the time when the beam is measured.

Figure 4:
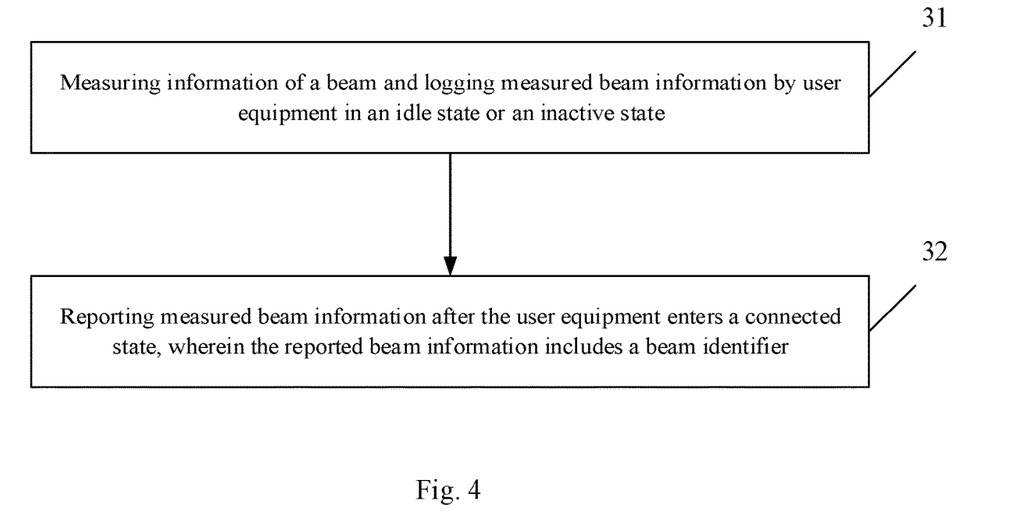
FIG. 4 is a schematic flow diagram of a measurement report method according to a third embodiment of the present disclosure.

Referring to FIG. 4, a third embodiment of the present disclosure provides a measurement report method applied to user equipment. The method includes:

step 31: measuring a beam and logging relevant information of the measured beam by user equipment in an idle state or an inactive state;

step 32: reporting the relevant information of the measured beam after the user equipment enters a connected state.

Multi-beam is introduced into the beamforming technology employed in 5G, i.e., each user equipment needs to use a particular beam in the cell to carry out communication. As a result, in addition to the measurement of a neighboring cell, measurement of nearby beams is required at cell handover. Therefore, the embodiment of the present disclosure provides a measurement report configuration method, so that user equipment may be configured to measure and report related information of a beam while measuring and reporting identifier and quality information of a cell. The measured beam can be used as a candidate beam during cell handover, and can also be used for determining the moving speed and direction of the user equipment, so that an appropriate target beam can be conveniently selected. The user equipment in the idle state or the inactive state measures and logs the measured beam information so as to prepare for the cell handover after the user equipment enters the connected state.

Specifically, the measured beam includes a beam of a camped cell and/or a neighboring cell.

Optionally, the relevant information of the beam includes at least one of:
an identifier of the beam;
quality information of the beam;
a time when the beam is measured or the beam measurement is logged.

In a specific implementation, the measured and logged beam information may also include beam quality information and the time when the beam is measured. In addition, it may also be defined that the logged beam is a beam with a quality exceeding a certain quality threshold, and those with a quality below the quality threshold are not logged.

As one specific implementation, the reporting the relevant information of the measured beam after the user equipment enters a connected state, namely step 32, includes:

a first step: receiving, by the user equipment in the connected state, inquiry information transmitted by a network device, wherein the inquiry information is used for inquiring whether the user equipment logs relevant information of a measured beam, and the network device can be a base station or other network element on a network side;

a second step: reporting, by the user equipment, the relevant information of the measured beam.

Specifically, the inquiry information includes at least one of:
an identifier of the beam;
quality information of the beam, the quality information of the beam may include one or more of following quality parameters: RSRP, RSRQ and SINR;
a quality threshold to be met by the beam, the quality threshold may be set with different threshold values depending on different quality parameters, or may be set with the same threshold value for different quality parameters;
a time when the beam is measured or the beam measurement is logged;
a minimum quantity of reported beams;
a format requirement on the identifier of the beam reported by the user equipment;
a format requirement on the quality information of the beam reported by the user equipment;
a format requirement on the time when the beam is measured or the beam measurement is logged reported by the user equipment.

In another specific implementation, the reporting the relevant information of the measured beam after the user equipment enters a connected state, namely step 32, includes:

a first step: transmitting a notification message to the network device by the user equipment, wherein the notification message is used for notifying the network device that the user equipment logs the relevant information of the measured beam;

a second step: receiving indication information transmitted by the network device based on the notification message, wherein the indication information is used for indicating that the user equipment is to report the relevant information of the beam measured by the user equipment, and the indication information includes at least one of: an identifier of the beam; quality information of the beam; a quality threshold to be met by the beam; a time when the beam is measured or the beam measurement is logged; a minimum quantity of reported beams; a format requirement on the identifier of the beam reported by the user equipment; a format requirement on the beam quality information reported by the user equipment; a format requirement on the time when the beam is measured or the beam measurement is logged reported by the user equipment;

a third step: the user equipment reports the relevant information of the measured beam according to the indication information.

In the specific implementation, a network device, such as a base station or other network element on the network side, does not query the user equipment about whether it logs relevant information of a measured beam, instead the user equipment actively informs the network device in an uplink message that the user equipment logs relevant information of a measured beam. The network device transmits indication information to the user equipment as needed, to indicate that the user equipment is to report the logged measured beam information. The indication information can indicate the specific information that the network device needs the user equipment to report, such as an identifier of the beam, quality information of the beam, a time when the beam is measured or the beam measurement is logged and the like, and can also include format requirements on the beam information reported by the user equipment.

Optionally, after the measuring a beam and logging relevant information of the measured beam by the user equipment in an idle state or an inactive state, the method further includes: determining, by the user equipment in the idle state or the inactive state, a speed of the user equipment according to the relevant information of the measured beam. Specifically, the user equipment may determine whether its speed is low, medium or high depending on the quantity of beams passed over a period of time. For example, if the quantity of beams passed by the user equipment (UE) in time T is between Nm and Nh, the user equipment is in a medium-speed state, and if the quantity of beams passed by the user equipment (UE) in time T is higher than Nh, the user equipment is in a high-speed moving state. The UE speed determination can be used for cell reselection.

Figure 5:
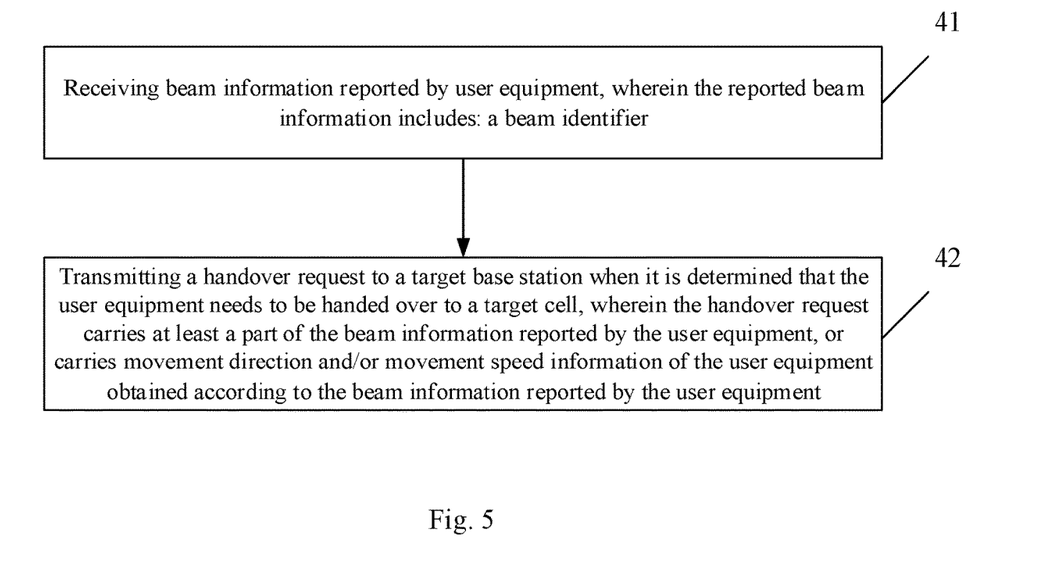
FIG. 5 is a schematic flow diagram of a cell handover method according to a fourth embodiment of the present disclosure.

Referring to FIG. 5, a fourth embodiment of the present disclosure provides a cell handover method applied to a network device. Specifically, the network device can be a source gNB. The method includes:

step 41: receiving relevant information of a beam reported by user equipment;

step 42: transmitting a handover request to a target base station when it is determined that the user equipment needs to be handed over to a target cell, wherein the handover request carries at least a part of the relevant information of the beam reported by the user equipment, or carries movement direction and/or movement speed information of the user equipment obtained according to the relevant information of the beam reported by the user equipment.

Multi-beam is introduced into the beamforming technology employed in 5G, i.e., each user equipment needs to use a particular beam in the cell to carry out communication. As a result, in addition to knowledge about a neighboring cell, knowledge of nearby beams is required at cell handover. Therefore, the embodiment of the present disclosure provides a cell handover method in which a source gNB receives the information of a measured beam reported by the user equipment in addition to the identifier and quality information of a cell reported by user equipment. The measured beam can be used as a candidate beam during cell handover, and can also be used for determining the moving speed and direction of the user equipment, so that an appropriate target beam can be conveniently selected. In addition, if the user equipment reports the measured beam related information, the target gNB can reserve for the user equipment dedicated random access resources used for initiating random access in the target cell and/or association information between the SS-block or CSI-RS and the random access resources, and transmit the same to the user equipment (UE) in a handover command.

Specifically, the relevant information of the beam reported by the user equipment includes relevant information of a beam of a camped cell and/or a serving cell and/or a neighboring cell.

In addition, for the specific method for user equipment to carry out the report and the reported relevant beam information, reference may be made to the above-mentioned second embodiment, and will not be described in detail here again.

Figure 6:
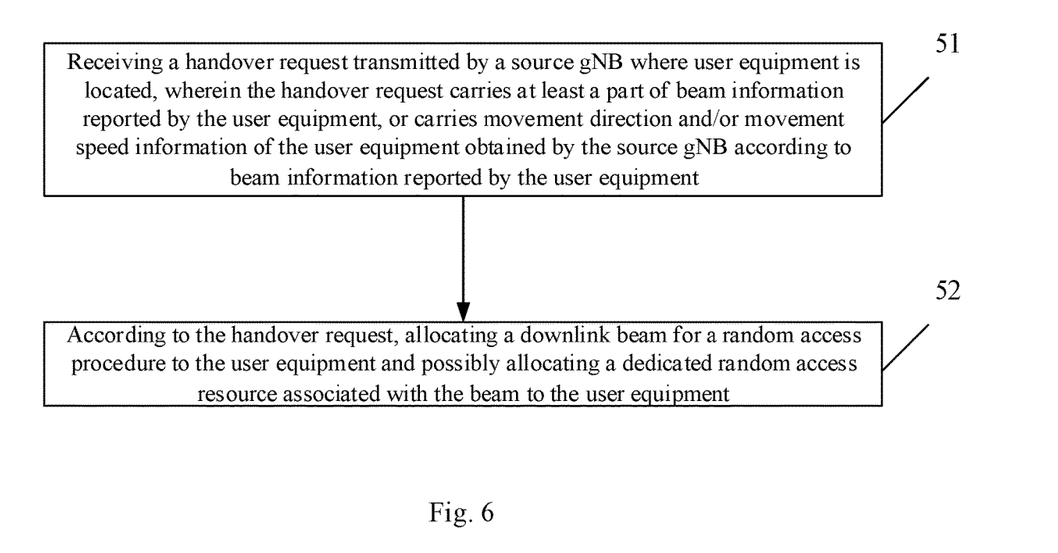
FIG. 6 is a schematic flow diagram of a cell handover method according to a fifth embodiment of the present disclosure.

Referring to FIG. 6, a fifth embodiment of the present disclosure provides a cell handover method applied to a network device. Specifically, the network device can be a target gNB corresponding to a target cell. The method includes:

step 51: receiving a handover request transmitted by a source base station where user equipment is located, wherein the handover request carries at least a part of relevant information of a beam reported by the user equipment, or carries movement direction and/or movement speed information of the user equipment obtained by the source base station according to the relevant information of the beam reported by the user equipment;

step 52: according to the handover request, allocating a downlink beam for a random access procedure to the user equipment and possibly allocating a dedicated random access resource associated with the beam to the user equipment, or reserving for the user equipment (UE) at least one of a dedicated random access resource and an available common random access resource in a target cell according to the handover request.

Specifically, the relevant information of the beam reported by the user equipment includes relevant information of a beam of a camped cell and/or a serving cell and/or a neighboring cell.

Further, after the network device allocates a downlink beam for a random access procedure and required access resource to user equipment according to a handover request, at least one of the dedicated random access resource reserved for the user equipment, the available common random access resource, and association information between an SS-block or CSI-RS and the random access resource is carried in a handover acknowledgement when the handover acknowledgement is transmitted to a source gNB, so that the source gNB may forward the information to the user equipment, to realize the user equipment random access in the target cell.

Optionally, the downlink beam for the random access procedure is a beam reported by the user equipment, or a beam determined according to the movement direction and/or movement speed information of the user equipment. Thereby, a beam of as good quality as possible can be allocated to the user equipment.

Figure 7:
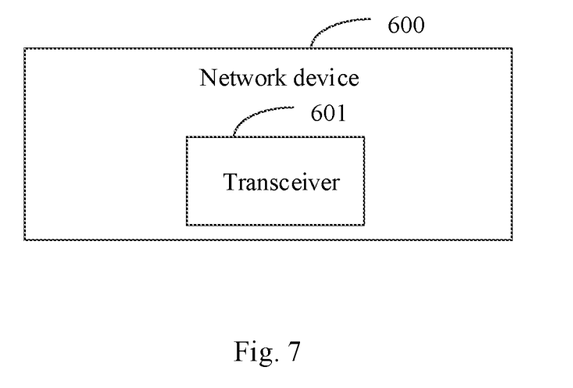
FIG. 7 is a schematic structural diagram of a network device according to a sixth embodiment of the present disclosure.

Referring to FIG. 7, a sixth embodiment of the present disclosure further provides a network device 600. The network device includes: a transceiver 601, configured to transmit measurement report configuration information to user equipment, wherein the configuration information includes: the user equipment is required to report relevant information of a measured beam.

Optionally, the relevant information of the beam includes at least one of:
an identifier of the beam;
quality information of the beam;
a quality threshold to be met by the beam;
a time when the beam is measured or the beam measurement is logged;
a minimum quantity of reported beams.

Optionally, the identifier of the beam is an index of a synchronization signal and PBCH block (SS-block) broadcast by the network device, and/or an index of channel state information reference signal (CSI-RS) configured by the network device for the user equipment.

Specifically, the configuration information includes a quality threshold of a beam reported by the user equipment, and the quality threshold includes at least one of an RSRP quality threshold, an RSRQ quality threshold and an SINR quality threshold, wherein the RSRP quality threshold, the RSRQ quality threshold and the SINR quality threshold are identical or different.

Specifically, the configuration information includes the minimum quantity of reported beams, and the minimum quantity of reported beams includes at least one of a minimum quantity configured with regard to SS-block RSRP, a minimum quantity configured with regard to SS-block RSRQ, a minimum quantity configured with regard to SS-block SINR, a minimum quantity configured with regard to CSI-RS RSRP, a minimum quantity configured with regard to CSI-RS RSRQ, and a minimum quantity configured with regard to CSI-RS SINR, wherein, the minimum quantity configured with regard to SS-block RSRP and the minimum quantity configured with regard to CSI-RS RSRP are identical or different, the minimum quantity configured with regard to SS-block RSRQ and the minimum quantity configured with regard to CSI-RS RSRQ are identical or different, and the minimum quantity configured with regard to SS-block SINR and the minimum quantity configured with regard to CSI-RS SINR are identical or different.

A specific operation process is consistent with the first embodiment, thus a detailed description is omitted herein. For a detailed description, reference may be made to the description corresponding to the method steps in the first embodiment.

Figure 8:
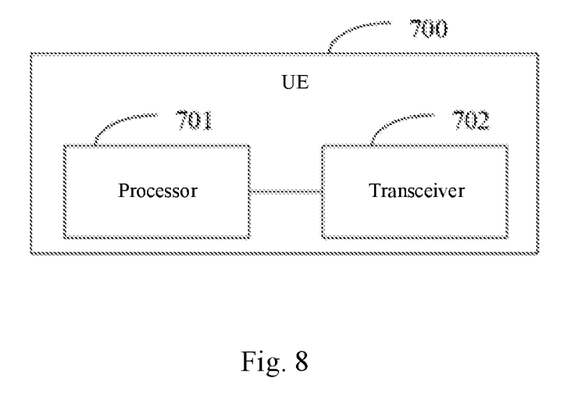
FIG. 8 is a schematic structural diagram of user equipment according to a seventh embodiment of the present disclosure.

Referring to FIG. 8, a seventh embodiment of the present disclosure further provides user equipment 700. The user equipment includes:

a processor 701, configured to measure a beam and obtain relevant information of the beam when the user equipment is in a connected state;

a transceiver 702, configured to report the relevant information of the beam.

Optionally, the reported relevant information of the beam includes at least one of:
an identifier of the beam;
quality information of the beam;
a time when the beam is measured or the beam measurement is logged.

Optionally, the transceiver is configured to receive measurement report configuration information transmitted by a network device, wherein the configuration information includes: the user equipment is required to report relevant information of a measured beam.

Optionally, the relevant information of the beam includes at least one of:
an identifier of the beam;
quality information of the beam;
a quality threshold to be met by the beam;
a time when the beam is measured or the beam measurement is logged;
a minimum quantity of reported beams.

Optionally, the identifier of the beam is an index of a synchronization signal and PBCH block (SS-block) broadcast by a network device, and/or an index of a channel state information reference signal (CSI-RS) configured by the network device for the user equipment.

Optionally, the reported beam includes all beams measured by the user equipment, or a beam having a quality greater than or equal to a quality threshold.

Optionally, in the reported relevant information of the beam, the reported beam is ordered in sequence, which may be forward sequence or reverse sequence, of time when the beam is measured.

Specifically, the reported relevant information of the beam includes: a beam measured based on SS-block and/or a beam measured based on CSI-RS, wherein the beam measured based on SS-block and/or the beam measured based on CSI-RS is separately or jointly ordered according to the time when the beam is measured.

A specific operation process is consistent with the second embodiment, thus a detailed description is omitted herein. For a detailed description, reference may be made to the description of the method steps in the corresponding second embodiment.

Figure 9:
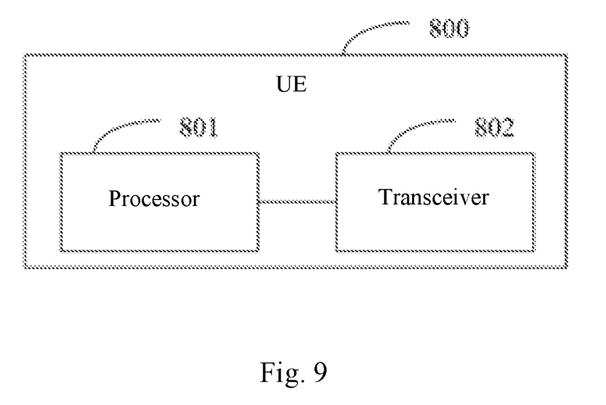
FIG. 9 is a schematic structural diagram of user equipment according to an eighth embodiment of the present disclosure.

Referring to FIG. 9, an eighth embodiment of the present disclosure further provides user equipment 800. The user equipment includes:

a processor 801, configured to measure a beam and log relevant information of the measured beam when the user equipment is in an idle state or an inactive state;

a transceiver 802, configured to report the relevant information of the measured beam after the user equipment enters a connected state.

Optionally, the reported relevant information of the beam includes at least one of:
an identifier of the beam;
quality information of the beam;
a time when the beam is measured or the beam measurement is logged.

Optionally, the transceiver 802 is configured to receive inquiry information transmitted by network device after the user equipment enters a connected state, wherein the inquiry information is used for inquiring whether the user equipment logs relevant information of a measured beam; and the user equipment reports the relevant information of the measured beam.

Optionally, the inquiry information includes at least one of:
an identifier of the beam;
quality information of the beam;
a quality threshold to be met by the beam;
a time when the beam is measured or the beam measurement is logged;
a minimum quantity of reported beams;
a format requirement on the identifier of the beam reported by the user equipment;
a format requirement on the quality information of the beam reported by the user equipment;
a format requirement on the time when the beam is measured or the beam measurement is logged reported by the user equipment.

In another optional specific implementation, the transceiver is configured to: transmit a notification message to a network device after the user equipment enters a connected state, wherein the notification message is used for notifying the network device that the user equipment logs relevant information of a measured beam; receive indication information transmitted by the network device based on the notification message, wherein the indication information is used for indicating that the user equipment is to report the relevant information of the beam measured by the user equipment, and the indication information includes at least one of: an identifier of the beam; quality information of the beam; a quality threshold to be met by the beam; a time when the beam is measured or the beam measurement is logged; a minimum quantity of reported beams; a format requirement on the identifier of the beam reported by the user equipment; a format requirement on the beam quality information reported by the user equipment; a format requirement on the time when the beam is measured or the beam measurement is logged reported by the user equipment; and the user equipment reports the relevant information of the measured beam according to the indication information.

Optionally, the processor is configured to determine a speed of the user equipment according to the relevant information of the measured beam when the user equipment is in an idle state or an inactive state.

A specific operation process is consistent with the third embodiment, thus a detailed description is omitted herein. For a detailed description, reference may be made to the description of the method steps in the corresponding third embodiment.

Figure 10:
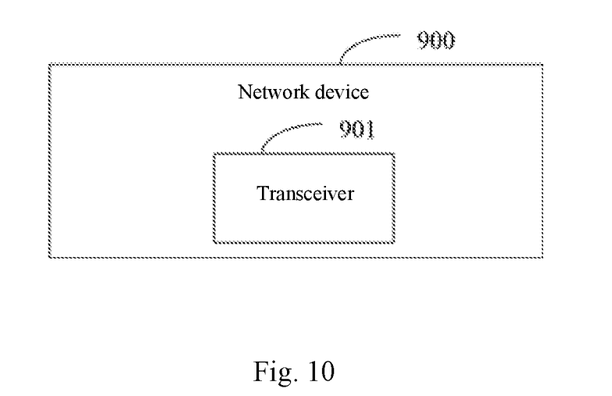
FIG. 10 is a schematic structural diagram of a network device according to a ninth embodiment of the present disclosure.

Referring to FIG. 10, an ninth embodiment of the present disclosure further provides a network device 900. The network device includes: a transceiver 901, configured to: receive relevant information of a beam reported by user equipment; and transmit a handover request to a target base station when it is determined that the user equipment needs to be handed over to a target cell, wherein the handover request carries at least a part of the relevant information of the beam reported by the user equipment, or carries movement direction and/or movement speed information of the user equipment obtained according to the relevant information of the beam reported by the user equipment.

A specific operation process is consistent with the fourth embodiment, thus a detailed description is omitted herein. For a detailed description, reference may be made to the description of the method steps in the corresponding fourth embodiment.

Figure 11:
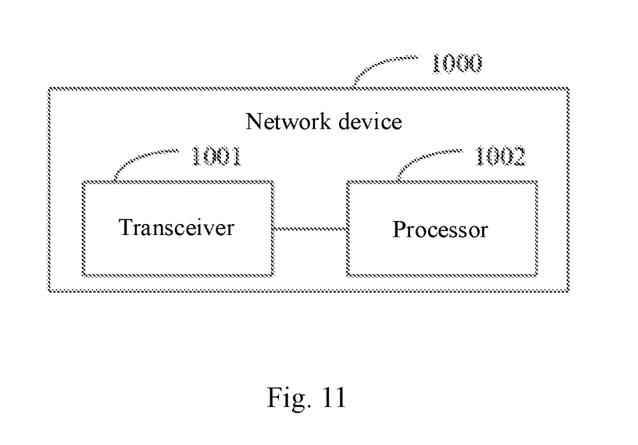
FIG. 11 is a schematic structural diagram of a network device according to a tenth embodiment of the present disclosure.

Referring to FIG. 11, a tenth embodiment of the present disclosure provides a network device 1000. The network device includes:

a transceiver 1001, configured to receive a handover request transmitted by a source base station where user equipment is located, wherein the handover request carries at least a part of relevant information of a beam reported by the user equipment, or carries movement direction and/or movement speed information of the user equipment obtained by the source base station according to the relevant information of the beam reported by the user equipment; and a processor 1002, configured to allocate a downlink beam for a random access procedure and/or dedicated random access resources associated with the beam to the user equipment according to the handover request.

Optionally, the downlink beam for the random access procedure is a beam reported by the user equipment, or a beam determined according to the movement direction and/or movement speed information of the user equipment.

A specific operation process is consistent with the fifth embodiment, thus a detailed description is omitted herein. For a detailed description, reference may be made to the description of the method steps in the corresponding fifth embodiment.

An eleventh embodiment of the present disclosure provides a network device including a memory, a processor and a computer program stored in the memory and configured to be executed by the processor; the processor is configured to execute the computer program to implement the measurement report configuration method provided in the first embodiment. A specific operation process is consistent with the abovementioned corresponding embodiment, thus a detailed description is omitted herein. For a detailed description, reference may be made to the description of the method steps in the corresponding embodiment.

A twelfth embodiment of the present disclosure provides user equipment including a memory, a processor and a computer program stored in the memory and configured to be executed by the processor; the processor is configured to execute the computer program to implement the measurement report method provided in the second embodiment or the third embodiment. A specific operation process is consistent with the abovementioned corresponding embodiments, thus a detailed description is omitted herein. For a detailed description, reference may be made to the description of the method steps in the corresponding embodiments.

A thirteenth embodiment of the present disclosure provide a network device including a memory, a processor, and a computer program stored in the memory and configured to be executed by the processor; the processor is configured to execute the computer program to implement the cell handover method provided in the fourth embodiment or fifth embodiment. A specific operation process is consistent with the abovementioned corresponding embodiments, thus a detailed description is omitted herein. For a detailed description, reference may be made to the description of the method steps in the corresponding embodiments.

A fourteenth embodiment of the present disclosure provides a computer-readable storage medium storing therein a computer program, the computer program is configured to be executed by a processor to perform the steps in the measurement report configuration method provided in the first embodiment, or perform the steps in the measurement report method provided in the second embodiment or third embodiment, or perform the steps in the cell handover method provided in the fourth embodiment or fifth embodiment. A specific operation process is consistent with the abovementioned corresponding embodiments, thus a detailed description is omitted herein. For a detailed description, reference may be made to the description of the method steps in the corresponding embodiments.

The network device in the embodiments of the present disclosure may be a base transceiver stations (BTS) in global system of mobile communication (GSM) or code division multiple access (CDMA), or a NodeB (NB) in wideband code division multiple access (WCDMA), or an evolutionary Node B (eNB or eNodeB) in LTE, or a relay station or an access point, or a base station in a future 5G network, etc., which is not limited herein.

The user equipment in the embodiments of the present disclosure may be a wireless terminal or a wired terminal. The wireless terminal may refer to a device that provides a user with voice and/or other service data connectivity, a handheld device having a wireless connection function, or another processing device connected to a wireless modem. The wireless terminal may communicate with one or more core networks through a radio access network (RAN). The wireless terminal may be a mobile terminal, for example, a mobile phone (or referred to as a "cellular" phone) or a computer equipped with a mobile terminal, and may be a portable, pocket-sized, handheld, computer built-in or in-vehicle mobile device, which exchanges voice and/or data with the RAN. For example, the wireless terminal may be a device such as a personal communication service (PCS) phone, a cordless phone, a session initiation protocol (SIP) phone, a wireless local loop (WLL) station or a personal digital assistant (PDA). The wireless terminal may also be referred to as a system, a subscriber unit, a subscriber station, a mobile station, a mobile, a remote station, a remote terminal, an access terminal, a user terminal, a user agent, a user device or user equipment, which is not limited herein.

The computer readable storage medium includes permanent and non-permanent, removable and non-removable media, and may achieve information storage by any means or techniques. Information may be computer readable instruction, data structure, program module or other data. Computer storage medium may, for example, include, but is not limited to: phase change random access memory (PRAM), static random access memory (SRAM), dynamic random access memory (DRAM), other types of random access memory (RAM), read-only memory (ROM), electrically erasable programmable read-only memory (EEPROM), flash memory or other memory technologies, compact disc read-only memory (CD-ROM), digital versatile disc (DVD) or other optical storages, cassette tape, magnetic tape, magnetic disk or other magnetic storage device or any other non-transmitting medium, which is configured to store information accessible by a computing device.

The above descriptions merely describe optional implementations of the present disclosure. It is appreciated, modifications and improvements may be made by a person of ordinary skill in the art without departing from the principle of the present disclosure, and these modifications and improvements shall fall within the scope of the present disclosure.

What is claimed is:

1. A measurement report method, applied to user equipment, comprising:
   performing beam measurement and logging first information of a measured beam by the user equipment in an idle state or an inactive state, and reporting by the user equipment the first information of the measured beam after the user equipment enters a connected state;
   performing beam measurement and reporting second information of a measured beam by the user equipment in the connected state, such that a source base station transmits a handover request to a target base station when it is determined that the user equipment needs to be handed over to a target cell, wherein the handover request carries at least a part of the second information of the measured beam reported by the user equipment or carries movement direction and/or movement speed information of the user equipment obtained according to the second information of the measured beam reported by the user equipment;
   receiving, from the source base station, association information between a synchronization signal and PBCH block (SS-block) or channel state information reference signal (CSI-RS) and a random access resource allocated by the target base station to the user equipment; wherein an index of the SS-block or CSI-RS in the association information is an identifier of a downlink beam determined by the target base station for the user equipment according to the handover request, and the random access resource is a dedicated random access resource in a one-to-one association with the beam.

2. The measurement report method according to claim 1, wherein the first information comprises at least one of:
   an identifier of the beam;
   quality information of the beam; or,
   a time when the beam is measured or the beam measurement is logged;
   and/or,
   the second information comprises at least one of:
   an identifier of the beam;
   quality information of the beam; or,
   a time when the beam is measured or the beam measurement is logged.

3. The measurement report method according to claim 1, wherein the reporting the first information of the measured beam after the user equipment enters the connected state comprises:
   receiving, by the user equipment in the connected state, inquiry information transmitted by a network device, wherein the inquiry information is used for inquiring whether the user equipment logs the first information of the measured beam;
   reporting the first information of the measured beam by the user equipment.

4. The measurement report method according to claim 3, wherein the inquiry information comprises at least one of:
   an identifier of the beam;
   quality information of the beam;
   a quality threshold to be met by the beam;
   a time when the beam is measured or the beam measurement is logged;
   a minimum quantity of reported beams;
   a format requirement on the identifier of the beam reported by the user equipment;
   a format requirement on the quality information of the beam reported by the user equipment;
   a format requirement on the time when the beam is measured or the beam measurement is logged reported by the user equipment.

5. The measurement report method according to claim 1, wherein the reporting the first information of the measured beam after the user equipment enters the connected state comprises:
   transmitting a notification message to the network device by the user equipment, wherein the notification message is used for notifying the network device that the user equipment logs the first information of the measured beam;
   receiving indication information transmitted by the network device based on the notification message, wherein the indication information is used for indicating that the user equipment is to report the first information of the beam measured by the user equipment, and the indication information comprises at least one of: an identifier of the beam; quality information of the beam; a quality threshold to be met by the beam; a time when the beam is measured or the beam measurement is logged; a minimum quantity of reported beams; a format requirement on the identifier of the beam reported by the user equipment; a format requirement on the quality information of the beam reported by the user equipment; a format requirement on the time when the beam is measured or the beam measurement is logged reported by the user equipment;
   reporting the first information of the measured beam by the user equipment according to the indication information.

6. The measurement report method according to claim 1, wherein, after the performing the beam measurement and logging the first information of the measured beam by the user equipment in the idle state or the inactive state, the method further comprises:
   determining, by the user equipment in the idle state or the inactive state, a speed of the user equipment according to the first information of the measured beam.

7. User equipment, comprising a memory, a processor, and a computer program stored in the memory and configured to be executed by the processor, wherein the processor is configured to execute the computer program to implement the measurement report method according to claim 1.

8. The user equipment according to claim 7, wherein the first information comprises at least one of:
   an identifier of the beam;
   quality information of the beam; or, a time when the beam is measured or the beam measurement is logged;

and/or, the second information comprises at least one of:

an identifier of the beam;

quality information of the beam; or, a time when the beam is measured or the beam measurement is logged.

9. The user equipment according to claim 7, wherein the reporting the first information of the measured beam after the user equipment enters the connected state comprises:

receiving, by the user equipment in the connected state, inquiry information transmitted by a network device, wherein the inquiry information is used for inquiring whether the user equipment logs the first information of the measured beam;

reporting the first information of the measured beam by the user equipment;

and/or, transmitting a notification message to the network device by the user equipment, wherein the notification message is used for notifying the network device that the user equipment logs the first information of the measured beam;

receiving indication information transmitted by the network device based on the notification message, wherein the indication information is used for indicating that the user equipment is to report the first information of the beam measured by the user equipment, and the indication information comprises at least one of: an identifier of the beam; quality information of the beam; a quality threshold to be met by the beam; a time when the beam is measured or the beam measurement is logged; a minimum quantity of reported beams; a format requirement on the identifier of the beam reported by the user equipment; a format requirement on the quality information of the beam reported by the user equipment; a format requirement on the time when the beam is measured or the beam measurement is logged reported by the user equipment;

reporting the first information of the measured beam by the user equipment according to the indication information.

10. The user equipment according to claim 9, wherein the inquiry information comprises at least one of:

an identifier of the beam;

quality information of the beam;

a quality threshold to be met by the beam;

a time when the beam is measured or the beam measurement is logged;

a minimum quantity of reported beams;

a format requirement on the identifier of the beam reported by the user equipment;

a format requirement on the quality information of the beam reported by the user equipment;

a format requirement on the time when the beam is measured or the beam measurement is logged reported by the user equipment.

11. The user equipment according to claim 7, wherein, after the measuring the beam and logging the first information of the measured beam by the user equipment in the idle state or the inactive state, the method further comprises:

determining, by the user equipment in the idle state or the inactive state, a speed of the user equipment according to the first information of the measured beam.

12. A computer readable storage medium storing therein a computer program, wherein the computer program is configured to be executed by a processor to implement the steps of the measurement report configuration method according to claim 1.

* * * * *